United States Patent
Jang

(10) Patent No.: US 10,186,133 B2
(45) Date of Patent: Jan. 22, 2019

(54) METHOD FOR DISASTER NOTIFICATION SERVICE NOT REQUIRING COLLECTING OF LOCATION INFORMATION, AND DISASTER NOTIFICATION SERVER AND APPLICATION SYSTEM THEREOF

(71) Applicant: EEYA Media Inc., Seoul (KR)

(72) Inventor: Boo Joong Jang, Seoul (KR)

(73) Assignee: EEYA MEDIA INC., Seoul (KR)

( * ) Notice: Subject to any disclaimer, the term of this patent is extended or adjusted under 35 U.S.C. 154(b) by 0 days.

(21) Appl. No.: 15/543,906

(22) PCT Filed: Jan. 14, 2016

(86) PCT No.: PCT/KR2016/000391
§ 371 (c)(1),
(2) Date: Jul. 14, 2017

(87) PCT Pub. No.: WO2016/114601
PCT Pub. Date: Jul. 21, 2016

(65) Prior Publication Data
US 2017/0358196 A1    Dec. 14, 2017

(30) Foreign Application Priority Data
Jan. 16, 2015    (KR) ........................ 10-2015-0007836

(51) Int. Cl.
*H04W 4/02*    (2018.01)
*H04W 4/06*    (2009.01)
(Continued)

(52) U.S. Cl.
CPC .......... *G08B 21/10* (2013.01); *G08B 27/006* (2013.01); *H04M 19/04* (2013.01); *H04W 4/02* (2013.01);
(Continued)

(58) Field of Classification Search
None
See application file for complete search history.

(56) References Cited

U.S. PATENT DOCUMENTS 6,456,234 B1 *   9/2002   Johnson .............. G06F 17/3087
                                                         340/988
8,923,800 B2   12/2014   Kim et al.
(Continued)

FOREIGN PATENT DOCUMENTS

JP   2013-021435   1/2013
KR   10-2012-0084560   7/2012
(Continued)

OTHER PUBLICATIONS

International Preliminary Report on Patentability dated Jul. 18, 2017, In International Application No. PCT/KR2016/000391.
(Continued)

*Primary Examiner* — Fekadeselassie Girma
(74) *Attorney, Agent, or Firm* — H.C. Park & Associates, PLC

(57) ABSTRACT

A method for a disaster notification service not requiring collecting of location information, and systems thereof. The method includes the steps of: receiving, from at least one registration system, disaster information including a disaster location and disaster notification information; specifying, a set of location information, each including location information which corresponds to the disaster location of each of at least one item of disaster information; transmitting, the specified set of location information to a plurality of user terminals; if any one of the plurality of user terminals determines that the location of the user terminal is included in matching location information included in the set of location information, receiving, a content transmission request including identification information of the matching location information; and transmitting, content including the
(Continued)

matching disaster notification information corresponding to the matching location information in response to reception of the content transmission request.

20 Claims, 8 Drawing Sheets

(51) Int. Cl.
| | |
|---|---|
| H04W 4/18 | (2009.01) |
| H04W 4/90 | (2018.01) |
| G08B 21/10 | (2006.01) |
| G08B 27/00 | (2006.01) |
| H04M 19/04 | (2006.01) |
| H04W 4/021 | (2018.01) |

(52) U.S. Cl.
CPC .............. *H04W 4/021* (2013.01); *H04W 4/06* (2013.01); *H04W 4/18* (2013.01); *H04W 4/90* (2018.02); *H04W 4/022* (2013.01)

(56) References Cited

U.S. PATENT DOCUMENTS

| | | | | |
|---|---|---|---|---|
| 2013/0040619 A1* | 2/2013 | Grube | .................... | H04W 8/22 455/414.1 |
| 2013/0281047 A1* | 10/2013 | Daly | ...................... | H04W 4/90 455/404.1 |
| 2013/0337789 A1* | 12/2013 | Johnson | ................. | H04W 4/02 455/414.1 |
| 2015/0281931 A1* | 10/2015 | Kim | ..................... | G06Q 10/063 455/404.2 |
| 2015/0312739 A1* | 10/2015 | Burt | ........................ | H04W 4/22 455/404.1 |
| 2015/0334545 A1* | 11/2015 | Maier | ..................... | H04W 4/70 455/404.2 |
| 2016/0029224 A1* | 1/2016 | Edge | ..................... | G01S 5/0252 455/456.1 |
| 2016/0142894 A1* | 5/2016 | Papakonstantinou | ........................ | H04W 4/023 455/404.1 |
| 2016/0148100 A1* | 5/2016 | Chang | .................... | G06Q 50/26 706/12 |
| 2016/0189529 A1* | 6/2016 | Lee | ...................... | G08B 25/008 340/541 |
| 2016/0189543 A1* | 6/2016 | Altintas | ................. | H04W 4/90 340/905 |
| 2016/0234828 A1* | 8/2016 | Smith | .................... | H04W 4/21 |
| 2016/0266733 A1* | 9/2016 | Alon | ....................... | H04L 67/18 |
| 2017/0039594 A1* | 2/2017 | Shaw | ................. | G06Q 30/0261 |

FOREIGN PATENT DOCUMENTS

| | | |
|---|---|---|
| KR | 10-2012-0096757 | 8/2012 |
| KR | 10-2013-0043422 | 4/2013 |
| KR | 10-2013-010804 | 9/2013 |

OTHER PUBLICATIONS

International Search Report dated May 9, 2016 in International Application No. PCT/KR2016/000391.

* cited by examiner

FIG. 3

| Disaster information1 | Disaster information2 | ........ | Disaster informationX | |
|---|---|---|---|---|
| Disaster location1 | Disaster location2 | : | Disaster locationX | ⤴ Specify location information set |
| Disaster notification information1 | Disaster notification information2 | : | Disaster notification informationX | |

METHOD FOR DISASTER NOTIFICATION SERVICE NOT REQUIRING COLLECTING OF LOCATION INFORMATION, AND DISASTER NOTIFICATION SERVER AND APPLICATION SYSTEM THEREOF

CROSS-REFERENCE TO RELATED APPLICATIONS

This application is the National Stage Entry of International Application PCT/KR2016/000391, filed on Jan. 14, 2016, and claims priority from and the benefit of Korean Patent Application No. 10-2015-0007836, filed on Jan. 16, 2015, both of which are incorporated herein by reference for all purposes as if fully set forth herein.

BACKGROUND

Field

The present invention relates to a method for a disaster notification service and a system thereof and, more particularly, to a method and system capable of sending disaster notification information generated in a disaster location only to users corresponding to a disaster location without collecting location information from users.

Discussion of the Background

With the rapid spread of mobile devices and app services, there is an increasing demand for a high-quality service in which many people can easily use disaster information anywhere and at any time.

In the case of the existing some disaster notification information services, however, when location information about a user is periodically collected and disaster notification information is to be transmitted to the user, disaster notification information is transmitted only to users who are present in a corresponding disaster location (area).

Such an example is described with reference to FIG. 1.

Referring to FIG. 1, a server for a disaster notification service (hereinafter referred to as a "disaster notification server" 10) periodically collects location information about each of a plurality of user terminals 20 (S10). Furthermore, disaster information is registered with a specific registration system (for example, an administrator terminal) (S10-1). The disaster information may include a disaster location and disaster notification information. The disaster notification server 10 determines a user terminal corresponding to the location included in the disaster information based on the collected location information (S20), and selectively sends the disaster notification information to the determined terminal (S30). For example, the disaster notification information may be transmitted to a terminal 21 and the disaster notification information may not be transmitted to a terminal 22. Accordingly, when specific disaster information is registered, the specific disaster information may be transmitted only to a user present in a location corresponding to the registered disaster information.

However, to this end, a conventional method (for example, an application "Safe Foothold" distributed by The Ministry of Public Safety and Security, Republic of Korea) has a problem of the collection of personal information because a disaster notification server must periodically collect the locations of users. Furthermore, a user's consent is also required for this collection. The conventional method has a problem in that the service is not utilized because users are reluctant to yield such consent. If personal information, such as location information about a user, is not collected, all pieces of disaster information may be transmitted to all users. In such a case, noise-like information is transferred to users who are present in unrelated locations, resulting in an increase of user inconvenience.

Accordingly, there is an urgent need for a technological means capable of sending notification information about a corresponding disaster to only users corresponding to a disaster location even without collecting location information about users.

SUMMARY

An object of the present invention is to provide a technological means in which disaster notification information can be selectively transmitted only to users at a location corresponding to a disaster location in such a way as to allow a user terminal to determine its corresponding disaster information even without collecting location information about a user.

Furthermore, there is provided a technological means in which the service server side cannot specify an accurate location of a user terminal in such a manner that information about a stepwise location wider than a disaster location is used or the user terminal also requests false location information in order to solve a problem in that when the user terminal receives specific disaster notification information from a disaster notification server, a location corresponding to the corresponding disaster notification information may be recognized as having been collected.

Furthermore, there is provided a technological means in which a user can be notified of adaptive information according to a change in the location of a user terminal although location information is not collected in real time because the user terminal determines its own location and selectively receives information.

A method for a disaster notification service according to an embodiment of the present invention for achieving the technological object includes the steps of receiving, by a disaster notification server, disaster information including the disaster location and disaster notification information, specifying, by the disaster notification server, a location information set including location information corresponding to each disaster location of the at least one piece of disaster information, sending, by the disaster notification server, the specified location information set to a plurality of user terminals, receiving a content transmission request, including the identification information of matching location information, from any one of the plurality of user terminals if the any one user terminal determines that the location of the user terminal is included in the matching location information included in the location information set, and sending, by the disaster notification server, content including matching disaster notification information corresponding to the matching location information to the user terminal in response to the reception of the content transmission request.

The method for a disaster notification service not requiring the collection of location information further includes the step of specifying, by the disaster notification server, a first disaster area including a disaster location corresponding to first disaster information when the first disaster information is registered. The step of specifying the location information set may include specifying information about the specified first disaster area as first location information corresponding to the first disaster information.

The method for a disaster notification service not requiring the collection of location information further includes the step of further specifying (n−1) (n is a natural number of 2 or more) second to n-th disaster areas including the first disaster area and having a wider range than the first disaster area. The step of specifying the location information set includes specifying information about the specified first disaster area and the further specified (n−1) disaster areas as the first location information corresponding to the first disaster information.

If the user terminal determines the first location information to be the matching location information corresponding to the location of the user terminal, the user terminal may play back the matching disaster notification information only when the location of the user terminal is included in an m-th disaster area corresponding to predetermined m (m is a natural number of 1 or more to (n−1) or less) of n disaster areas included in the first location information.

If the user terminal determines the first location information to be the matching location information corresponding to the location of the user terminal, the matching disaster notification content is transmitted to the user terminal. If the user terminal determines that the location of the user terminal changes to the direction of a (p−1)-th disaster area in the state in which the location corresponds to a p-th (p is a natural number of 1 or more to n or less) disaster area of n disaster areas included in the first location information, the user terminal may play back warning content.

The step of receiving the content transmission request including the identification information of the matching location information from the user terminal includes receiving the content transmission request further including the identification information of at least one piece of false location information. The step of sending, by the disaster notification server, the content including the matching disaster notification information corresponding to the matching location information to the user terminal in response to the reception of the content transmission request includes sending the content, further including disaster notification information corresponding to the identification information of the false location information, to the user terminal. Only the matching disaster notification information may be played back by the user terminal.

A method for a disaster notification service for achieving the technological object includes the steps of, when a disaster notification server sends location information set including location information corresponding to the each disaster location of at least one piece of disaster information to a plurality of user terminals, the at least one piece of disaster information including the disaster location and disaster notification information being registered with the disaster notification server, determining, by an application system installed in any one of the plurality of user terminals, whether the location of the user terminal is included in matching location information which is any one piece of location information included in the location information set, sending, by the application system, a content transmission request including the identification information of the matching location information to the disaster notification server if the application system determines that the location of the user terminal is included in the matching location information, and receiving, by the application system, content including matching disaster notification information corresponding to the matching location information from the disaster notification server as a response to the transmission of the content transmission request.

The matching location information may be implemented as information including first to n-th (n is a natural number of 2 or more) disaster areas. The method for a disaster notification service not requiring the collection of location information may further include the step of playing back, by the application system, the matching disaster notification information in the user terminal only when the location of the user terminal is included in an m-th disaster area corresponding to predetermined m (m is a natural number of 1 or more to (n−1) or less) of the n disaster areas included in the matching location information.

The method for a disaster notification service not requiring the collection of location information may further include the step of playing back, by the user terminal, warning content when the application system determines that the location of the user terminal changes to the direction of a (p−1)-th disaster area in the state in which the location corresponds to a p-th (p is a natural number of 1 or more to n or less) disaster area of the n disaster areas included in the matching location information.

The step of sending the content transmission request includes sending, by the application system, the content transmission request further including the identification information of at least one piece of false location information. The step of receiving the content includes receiving, by the application system, the content further including disaster notification information corresponding to the identification information of the false location information. The application system may play back only the matching disaster notification information.

There can be provided a computer program installed in a data processing device in order to implement the method.

A disaster notification server for solving the technological object includes a location information set specification unit for specifying location information set including location information corresponding to the each disaster location of at least one piece of disaster information when disaster information including the disaster location and disaster notification information is received, a communication unit which sends the specified location information set to a plurality of user terminals and receives a content transmission request including the identification information of matching location information if any one of the plurality of user terminals determines that the location of the user terminal is included in the matching location information included in the location information set, and a control unit for sending content including matching disaster notification information corresponding to the matching location information to the user terminal in response to the reception of the content transmission request.

The location information set specification unit may specify a first disaster area including a disaster location corresponding to first disaster information when the first disaster information is registered and specifies information about the specified first disaster area as first location information corresponding to the first disaster information.

The location information set specification unit may further specify (n−1) (n is a natural number of 2 or more) second to n-th disaster areas including the first disaster area and having a wider range than the first disaster area and specify information about the specified first disaster area and the further specified (n−1) disaster areas as the first location information corresponding to the first disaster information.

The communication unit receives the content transmission request further including the identification information of at least one piece of false location information. The control unit sends the content further including disaster notification information corresponding to the identification information of the false location information to the user terminal. Only matching disaster notification information may be played back by the user terminal.

An application system installed in a user terminal for solving the technological object includes a communication module for receiving location information set including location information corresponding to the each disaster location of at least one piece of disaster information from a disaster notification server, the at least one piece of disaster information including the disaster location and disaster notification information being registered with the disaster notification server, a location determination module for determining the location of the user terminal, and a control module for determining whether the determined location of the user terminal is included in matching location information which is any one of pieces of location information included in the location information set. The control module sends a content transmission request including the identification information of the matching location information to the disaster notification server through the communication module if it is determined that the location of the user terminal is included in the matching location information and receives content including matching disaster notification information corresponding to the matching location information from the disaster notification server as a response to the transmission of the content transmission request.

The control module determines whether the location of the user terminal is included in an m-th disaster area corresponding to predetermined m (m is a natural number of 1 or more to (n−1) or less) of the n disaster areas included in the matching location information, and may play back the matching disaster notification information in the user terminal only when the location of the user terminal is included in the m-th disaster area.

The control module may play back the matching disaster notification information in the user terminal only when the location of the user terminal is included in an m-th disaster area corresponding to predetermined m (m is a natural number of 1 or more to (n−1) or less) of the n disaster areas included in the matching location information.

The control module sends the content transmission request further including the identification information of at least one piece of false location information and receives the content further including disaster notification information corresponding to the identification information of the false location information. The control module may play back only the matching disaster notification information of disaster notification information included in the received content.

In accordance with the technological spirit of the present invention, an object to be achieved by the present invention has an effect in that disaster notification information can be selectively transmitted to only a user at a location corresponding to a disaster location even without collecting location information about the user because a user terminal determines its corresponding disaster information.

Furthermore, although the issue of the collection of personal information is simply solved if disaster notification server does not store information about transmitted information after disaster information required by a user terminal is transmitted, there may be a concern that a disaster notification server may know a location corresponding to corresponding disaster notification information when specific disaster notification information is transmitted from the disaster notification server. However, there is an effect in that such a concern can be solved because the service server side does not need to specify an accurate location of a user terminal in such a manner that information about a stepwise location wider than a disaster location is used or the user terminal also requests false location information.

Furthermore, if stepwise location information is used, there is an effect in that a user can be immediately notified of adaptive information (for example, information to restrain a movement in a disaster area direction) in response to a change in the location of a user terminal although a danger attributable to a disaster is now not present.

BRIEF DESCRIPTION OF DRAWINGS

A brief description of each of drawings is provided for more sufficient understanding of the drawings cited in the detailed description of the present invention.

FIG. 3 is a diagram for illustrating location information set according to an embodiment of the present invention.

DETAILED DESCRIPTION OF THE ILLUSTRATED EMBODIMENTS

Figure 1:
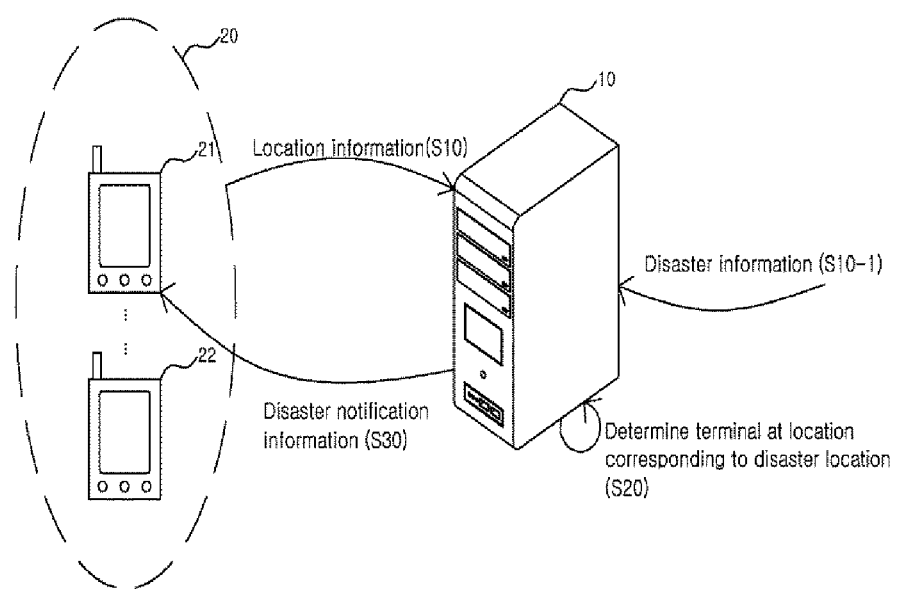
FIG. 1 is a diagram for schematically illustrating a conventional disaster notification service.

In order to fully understand the present invention, advantages in the operation of the present invention, and objects achieved by the implementation of the present invention, reference should be made to the accompanying drawings illustrating preferred embodiments of the present invention and contents written in the accompanying drawings.

Furthermore, in this specification, if one element "sends" data to the other element, this means that one element may directly send the data to the other element or may send the data to the other element through at least yet another element. In contrast, if one element "directly sends" data to the other element, this means that the data is transmitted from one element to the other element without the intervention of another element.

Hereinafter, the present invention is described in detail by describing preferred embodiments of the present invention with reference to the accompanying drawings. The same reference numerals proposed in the drawings denote the same member FIG. 2 is a diagram for schematically illustrating a method for a disaster notification service according to an embodiment of the present invention.

Figure 2:
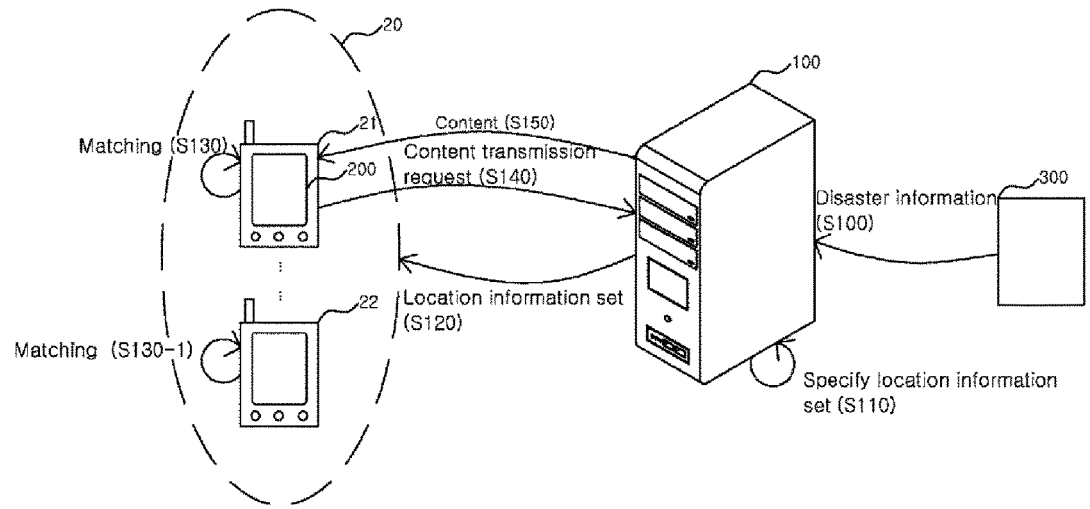
FIG. 2 is a diagram for schematically illustrating a method for a disaster notification service according to an embodiment of the present invention.

Referring to FIG. 2, for the purpose of the method for a disaster notification service according to an embodiment of the present invention, a disaster notification server 100 may be provided. Furthermore, a plurality of user terminals 20 capable of performing communication with the disaster notification server 100 may be provided. Software code for implementing the technological spirit of the present invention may be installed in the plurality of user terminals 20. The software code is defined as an application in this specification. The application may be independent software for implement the technological spirit of the present invention and may be software additionally installed in the application already installed in each of the plurality of user terminals 20.

The application and the hardware of each of the plurality of user terminals 20 may be organizationally combined to implement the application system 200 according to the technological spirit of the present invention.

A specific registration system 300 may register disaster information with the disaster notification server 100 (S100). In some implementation examples, if an input device (for example, a keyboard or a mouse) capable of inputting information to the disaster notification server 100 is connected to the disaster notification server 100, an administrator may directly register disaster information with the disaster notification server 100. The registration system 300 may be a terminal used on the service providing side that provides the method for a disaster notification service according to the technological spirit of the present invention, such as the administrator of the disaster notification server 100. Alternatively, in some implementation examples, a user may register the disaster information with the disaster notification server 100. In such a case, the terminal of the user may be the registration system 300. In either case, the registration system 300 has only to be a data processing device capable of registering the disaster information with the disaster notification server 100.

The disaster information includes information about the location where a disaster was generated, that is, a disaster location, and disaster notification information, of which a user must be notified when a disaster is generated. The disaster location and the disaster notification information may be registered by the registration system 300 at the same time, but may be sequentially registered by the registration system 300, if necessary. Furthermore, the registration system 300 by which the disaster information is registered may also be a plurality of physical devices.

The disaster notification server 100 may specify a location information set in pieces of disaster information registered by the registration system 300 (S110). The location information set may mean a gathering (set) of location information specified based on a disaster location included in each of pieces of disaster information.

The location information may be the disaster location itself or may mean a specific area including the disaster location. Such an example is described with reference to FIG. 3.

FIG. 3 is a diagram for illustrating location information sets according to an embodiment of the present invention.

Referring to FIGS. 2 and 3, at least one piece of disaster information from the registration system 300 may be registered with the disaster notification server 100. For example, disaster information 1 to disaster information X may be registered with the disaster notification server 100.

Pieces of disaster information (for example, the disaster information 1 to the disaster information X) may include disaster locations (for example, a disaster location 1 to a disaster location X) and disaster notification information (for example, disaster notification information 1 to disaster notification information X), respectively.

In this case, the disaster notification server 100 may specify the location information corresponding to the respective disaster locations (for example, the disaster location 1 to the disaster location X), and may specify location information set including the pieces of specified location information, respectively (S110).

As described above, each of the pieces of location information may be a disaster location itself, but may also be specified as a specific area including a corresponding disaster location. Furthermore, the range of the area may be differently set depending on the type of disaster. The disaster notification server 100 may have previously stored information about how to specify an area (range) for specifying location information for each disaster type. Of course, information about an area including a disaster location, that is, the location information, from the registration system 300 may be registered with the disaster notification server 100 as a disaster location. In such a case, the disaster location itself may be specified as location information without any change.

Furthermore, the disaster notification server 100 may send the specified location information set to the plurality of user terminals 20 (S120). As described above, in accordance with the technological spirit of the present invention, only pieces of location information indicative of the locations where disasters were generated may be transmitted to the plurality of user terminals 20. The location information may be data having a relatively smaller amount than the disaster notification information. Accordingly, although a location information set is transmitted to a user not related to the location where a disaster was generated, the waste of traffic may not be so great. In particular, if disaster notification information is implemented in the form of multimedia easily recognizable by a user, such as an image or a moving image, the location information may be implemented with a very small amount of data compared to the disaster notification information. Traffic for sending such a small amount of data may be a waste for a specific user terminal, but as described above, there is an effect in that the disaster notification information is transmitted to only a user corresponding to the disaster location even without a need for the collection of location information.

When the location information set are transmitted to the plurality of user terminals 20 as described above, each of the plurality of user terminals 20 may determine whether the received location information set is matched up with itself (S130, S130-1). That is, each of the user terminals 20 may determine whether the location information set are matched up with its own location. The meaning that a location information set is matched up with a specific user terminal (for example, 21) may mean that the location of the user terminal (for example, 21) is included in at least one piece of location information included in the location information set. This may mean that the location of the user terminal (for example, 21) is the same as the location where at least one disaster was generated or belongs to a predetermined range. Furthermore, location information that belongs to the pieces of location information included in the location information set and that includes the location of the user terminal (for example, 21) may be defined as matching location information.

To this end, the user terminal (for example, 21) may determine its own location using a specific method and may determine whether the determined location corresponds to any one piece of location information included in the location information set.

After whether its own location is matched up with the location information set is determined by each of the plurality of user terminals 20 as described above (S130, S130-1), a user terminal (for example, 21) that belongs to the plurality of user terminals 20 and that has determined that its own location is matched up with the location information set may send a request to send content, that is, a content transmission request including identification information about the matched location information of the pieces of location information included in the location information set, that is, matching location information, to the disaster notification server 100 (S140). Accordingly, the disaster notification server 100 may send content, including disaster notification information corresponding to the matching location information included in the content transmission request, to the user terminal (for example, 21) in response to the content transmission request received from the user terminal (for example, 21). For example, the user terminal (for example, 21) corresponds to the location information set. In this case, the matching location information may be location information X corresponding to a disaster location X. Accordingly, the disaster notification server 100 may send content, including disaster notification information (for example, disaster notification information X) corresponding to the matching location information, to the user terminal (for example, 21).

Furthermore, a user terminal (for example, 22) determines whether its own location corresponds to a received location information set. If, as a result of the determination, the user terminal (for example, 22) determines that its own location does not correspond to the received location information set, it may not make a content transmission request from the disaster notification server 100.

As described above, in accordance with the technological spirit of the present invention, the disaster notification server 100 sends only information about the location where a disaster was generated to the plurality of user terminals 20. If each of the plurality of user terminals 20 is related to the location where the disaster was generated, each user terminal obtains corresponding disaster notification information in such a way as to fetch it from the disaster notification server 100. Accordingly, the disaster notification server 100 may selectively send disaster notification information to only a user terminal (for example, 21) related to the location where a disaster was generated although it is unaware of each of the plurality of user terminals 20.

Meanwhile, if the method for a disaster notification service is implemented according to the aforementioned technological spirit, the problem of the collection of personal information may not be generated because location information about each of the plurality of user terminals 20 is not artificially collected. However, in the case where the disaster notification server 100 sends content to a specific user terminal (for example, 21), if location information corresponding to the content has been recorded on the disaster notification server 100, there is a concern that the disaster notification server 100 becomes aware of the location information of the specific user terminal (for example, 21). Of course, if transmitted content and location information corresponding to the transmitted content are not recorded, such a concern may be solved, but there may be a need to store pieces of such information according to the service. Even in such a case, in accordance with the technological spirit of the present invention, a technological spirit capable of solving the concern can be further provided.

Such a technological spirit may not allow the disaster notification server 100 to recognize a detailed location although actually corresponding location information has been transmitted to a user terminal (for example, 21) by specifying the location information as stepwise location information as will be described later, that is, by defining the location information in a relatively wider range than a disaster location or the location of the user terminal (for example, 21). Alternatively, the technological spirit may not allow the disaster notification server 100 to recognize actual location information about the user terminal (for example, 21) by enabling the user terminal (for example, 21) to further request at least one piece of false location information from the disaster notification server 100 in addition to matching location information corresponding to its own location. A detailed embodiment of the technological spirit is described later.

Figure 4:
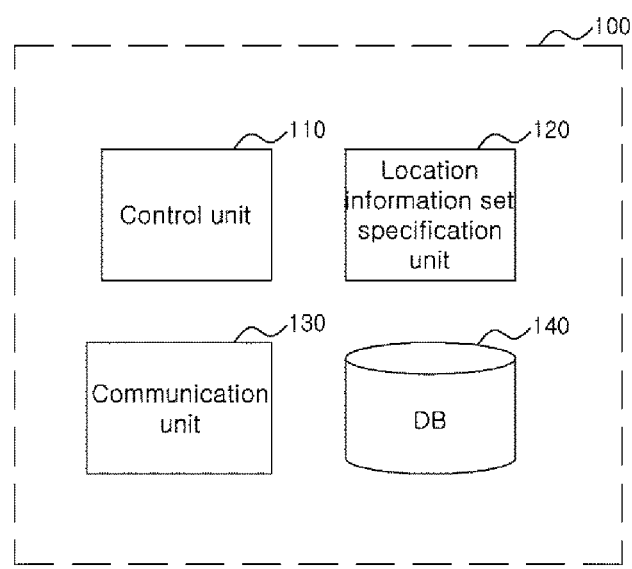
FIG. 4 is a diagram for illustrating a schematic configuration of a disaster notification server according to an embodiment of the present invention.

FIG. 4 is a diagram for illustrating a schematic configuration of the disaster notification server according to an embodiment of the present invention.

Referring to FIG. 4, the disaster notification server 100 includes a control unit 110, a location information set specification unit 120, and a communication unit 130. The disaster notification server 100 may further include a DB 140 and/or a disaster registration unit 140.

In this specification, the module or "unit" may mean a functional, structural combination of hardware for performing the technological spirit of the present invention, and software for driving the hardware. For example, a person having ordinary skill in the art to which the present invention pertains may easily infer that each of the elements may mean a logical unit of specific code and hardware resources on which the specific code is to be performed and does not essentially mean physically connected code or one kind or a specific number of pieces of hardware. Accordingly, each of the elements means a combination of hardware and software which perform a function defined in this specification and does not mean a specific physical element. Furthermore, a plurality of physically devices may be organically combined through communication to implement the disaster notification server 100 implemented.

The control unit 110 may control the functions and/or resources of other elements (for example, the location information set specification unit 120, the communication unit 130 and/or the DB 140 etc.) included in the disaster notification server 100.

When at least one piece of disaster information is registered, the location information set specification unit 120 may specify a location information set based on the at least one piece of disaster information as described above. To this end, the location information set specification unit 120 may specify each piece of location information based on a disaster location included in each of the at least one piece of disaster information.

The communication unit 130 may perform communication with the plurality of user terminals 20.

Accordingly, the control unit 110 may send the specified location information set to the plurality of user terminals 20 through the communication unit 130. Furthermore, if a specific user terminal (for example, 21) has determined that the location information set corresponds to the location of the user terminal (for example, 21), the control unit 110 may receive a content transmission request including the identification information of the matching location information from the user terminal (for example, 21).

Accordingly, the control unit 110 may send content, including disaster notification information corresponding to the matching location information, that is, matching disaster notification information, to the user terminal (for example, 21) through the communication unit 130 in response to the reception of the content transmission request.

The DB 140 may store registered disaster information, location information set, etc. and may also store other pieces of information for implementing the technological spirit of the present invention.

The disaster registration unit 140 may receive the disaster information from the registration system 300 and store the received disaster information in the DB 140.

Meanwhile, an example in which the location information set specification unit 120 specifies location information is described with reference to FIG. 6(*a*) and FIG. 6(*b*).

Figure 6A:
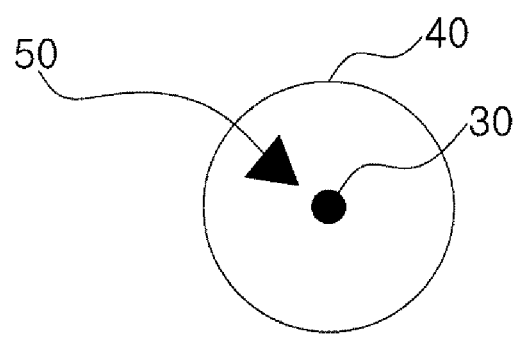
FIG. 6(a) and FIG. 6(b) are diagrams for illustrating (stepwise) location information according to an embodiment of the present invention.

FIGS. 6(*a*) and 6(*b*) are diagrams for illustrating (stepwise) location information according to an embodiment of the present invention.

Referring to FIGS. 3 and 6(*a*), when the first disaster information of at least one piece of disaster information is registered, the location information set specification unit 120 may specify a first disaster area 40 including a disaster location 30 corresponding to the first disaster information. Furthermore, the location information set specification unit 120 may specify information about the first disaster area 40 as location information corresponding to the first disaster information, that is, as first location information.

The location information set specification unit 120 may differently set the range of the first disaster area 40 depending on the type of disaster. For example, if disaster influences a wide range, the first disaster area 40 may be set as a wide range. If disaster influences a narrow range, the first disaster area 40 may be set as a narrow range.

Accordingly, each user terminal (for example, 21) may determine whether the first location information corresponds to its own location 50 by determining whether its own location 50 is included in the first disaster area 40.

As described above, if the location information set specification unit 120 sends information about a specific area instead of sending the disaster location 30 itself to each of the plurality of user terminals 20, there is an effect in that a user terminal (for example, 21) can more easily determine whether it corresponds to corresponding location information (that is, the first disaster area 40), that is, whether it is included in the corresponding location information.

Furthermore, if stepwise location information is used as in FIG. 6(*b*), there is an effect in that the disaster notification server 100 is unaware of a detailed location of a user terminal (for example, 21) as described above, but can provide disaster notification information to only a user included in a required area (for example, the first disaster area).

Referring to FIG. 6(*b*), the location information set specification unit 120 may set location information corresponding to a specific disaster location 30, as n (for example, n=3) disaster areas in stages, as shown in FIG. 6(*b*). In this case, n may be a natural number of 2 or more, or n may be adaptively set depending on an implementation example or the type of disaster.

For example, the n disaster areas may include a first disaster area 40 that includes the disaster location 30 and is set as a specific range, a second disaster area 41 that includes the first disaster area 40 and is set as a wider range than the first disaster area 40, and a third disaster area 42 that includes the second disaster area 41 and is set as a wider range than the second disaster area 41.

If a plurality of disaster areas is set in stages based on the disaster location 30 as described above, a degree of danger according to a corresponding disaster can be differently set depending on a stepwise set disaster area. Accordingly, there is an effect in that adaptive notification information can be provided to a user depending on a degree of danger. For example, the first disaster area 40 may be set as a danger area, the second disaster area 41 may be set as a semi-danger area, and the third disaster area 42 may be set as a semi-safe area. Accordingly, there is an effect in that the disaster notification server 100 can selectively send notification information suitable for a degree of danger depending on each area.

Furthermore, if stepwise location information is used as described above, there is an effect in that the disaster notification server 100 is unaware of a detailed (relatively accurate) location of a user terminal (for example, 21), but the user terminal (for example, 21) can provide a user with disaster notification information only when the disaster location 30 is within a required range from its own location.

For example, location information, such as that shown in FIG. 6(*b*), may be set as 3-step disaster areas (for example, 40, 41 and 42). In such a case, if a user terminal (for example, 21) has only to correspond to the location information, that is, if the user terminal (for example, 21) is included in the third disaster area 42 that is the widest range of the location information, it may determine the location information to be location information corresponding to its own location.

Accordingly, if a content transmission request including the identification information of the location information, that is, matching location information, is received from the user terminal (for example, 21), the disaster notification server 100 is aware that the user terminal (for example, 21) is present in a relatively wide range like the location information, but is unaware of a sufficiently detailed location to the extent that the detailed location can have a meaning as personal information.

However, the user terminal (for example, 21) is accurately aware of its own location. Accordingly, the user terminal (for example, 21) may provide a user with corresponding matching disaster notification information by playing back the corresponding matching disaster notification information (for example, display the information on a screen or play back it in a voice form) only when its own location (for example, 50 or 51) is included in predetermined m disaster areas of the n disaster areas. Of course, in this case, m may be a natural number smaller than n. The meaning that the location of the user terminal is included in the m disaster areas may mean that it is included in the disaster areas from 1 to m.

Figure 6B:
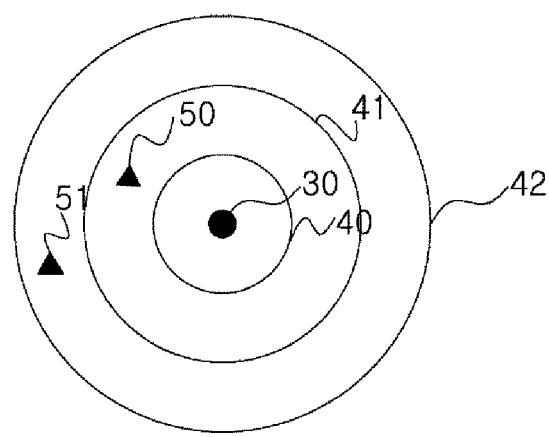

For example, the user terminal (for example, 21) may determine that location information, such as that shown in FIG. 6*b*, corresponds to its own location. Accordingly, the user terminal (for example, 21) may receive content, including matching disaster notification information corresponding to the location information, that is, matching location information, from the disaster notification server 100. In this case, the matching disaster notification information may be implemented as a plurality of (for example, n) different pieces of notification information that are set to correspond to respective disaster areas (for example, 40, 41 and 42).

As described above, the disaster notification server 100 may be aware that the user terminal (for example, 21) corresponds to only the location information, that is, a relatively wide range.

However, the user terminal (for example, 21) may play back corresponding matching disaster notification information only when its own location is included in predetermined m (for example, 2) disaster areas. For example, the user terminal (for example, 21) may play back corresponding matching disaster notification information (for example, disaster notification information corresponding to the second disaster area 41) only when its own location (for example, 50) is included in the second disaster area 41. In such a case, disaster notification information corresponding to the first disaster area 40 may be played back even when the location of the user terminal (for example, 21) is included in the first disaster area 40.

However, if the location of the user terminal (for example, 21) corresponds to the location information, but is present outside the m disaster areas, for example, if the location of the user terminal (for example, 21) is included in the third disaster area like the location 51, the user terminal (for example, 21) may not play back matching disaster notification information. That is, any notification information may not be provided to a user.

Accordingly, from a viewpoint of a user terminal (for example, 21), there is an effect in that the user terminal can play back disaster notification information only when it is present within a required range from the disaster location 30.

Furthermore, if stepwise location information is used as in the technological spirit of the present invention, there is an effect in that although the disaster notification server 100 is unaware of the location of a user terminal (for example, 21) in real time when the location of the user terminal is changed, the guidance of adaptive information can be provided to a user in response to a change in the location.

For example, if the user terminal (for example, 21) determines that the location of the user terminal (for example, 21) changes to the direction of a (p−1)-th disaster area in the state in which the location of the user terminal (for example, 21) corresponds to the p-th (p is a natural number of 1 or more to n or less) disaster area of n disaster areas included in the location information, that is, if the user terminal (for example, 21) determines that a user moves to the direction of a disaster location, the user terminal (for example, 21) may play back specific warning content.

Such an example is described with reference to FIG. 7.

Figure 7:
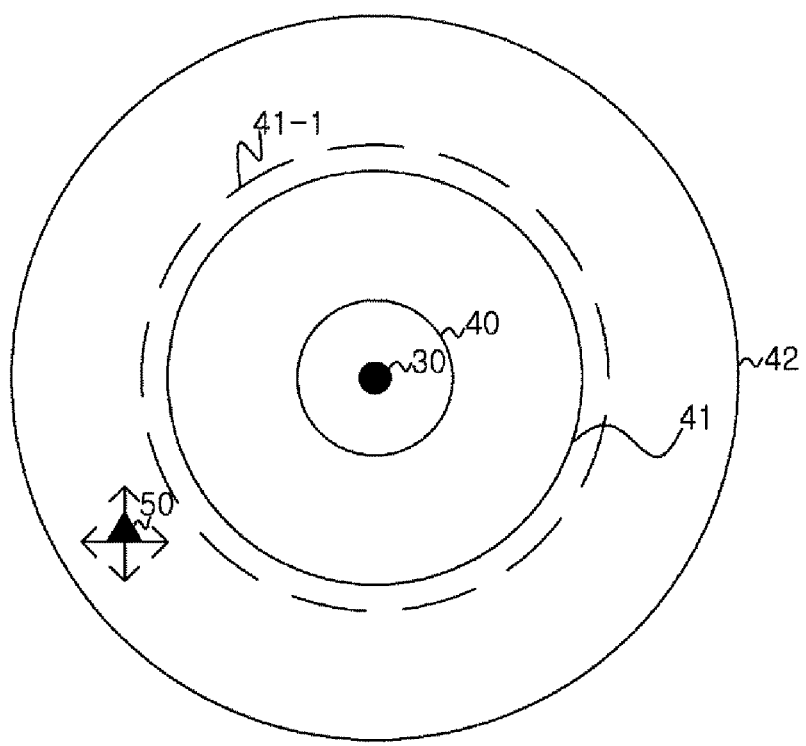
FIG. 7 is a diagram for illustrating the guidance of adaptive information according to a change in the location of a user in accordance with an embodiment of the present invention.

FIG. 7 is a diagram for illustrating the guidance of adaptive information according to a change in the location of a user in accordance with an embodiment of the present invention.

Referring to FIG. 7, location information according to the technological spirit of the present invention may have been set as a plurality of (for example, 3) disaster areas (for example, 40, 41 and 42) in stages based on a disaster location 30 as described above.

Furthermore, a user terminal (for example, 21), as shown, may be present at a location 50 included in the third disaster area 42 only.

If the user terminal (for example, 21) has been implemented to play back matching disaster notification information only when it is included in the second disaster area 41, the user terminal (for example, 21) present at the location 50 may not provide any notification information to a user. However, as described above, matching disaster notification information corresponding to the location information may be the state in which it has already been received by the user terminal (for example, 21).

Accordingly, if the user terminal (for example, 21) moves from the current location 50 to the direction of a lower disaster area (for example, the second disaster area 41) having a smaller number, the user terminal (for example, 21) may play back specific warning content. For example, warning content, such as "if you continue to move in the current moving direction, you may enter a semi-danger area" may be played back by the user terminal (for example, 21). Such warning content may be played back only when the user terminal (for example, 21) enters a neighboring section (for example, 41-1) that neighbors the lower disaster area (for example, 41) of the current location 50 within a specific range or the user terminal (for example, 21) is included in the neighboring section (for example, 41-1).

Of course, when the user terminal (for example, 21) moves from the second disaster area 41 to the direction of the first disaster area 40, warning content, such as that described above, may be played back. Of course, the user terminal (for example, 21) may sense whether its own moving direction is directed toward a lower disaster area in various ways.

Furthermore, in some implementation examples, although the location of the user terminal (for example, 21) does not correspond to the location information (shown in FIG. 7), if only location information has already been received by the user terminal (for example, 21) as in the technological spirit of the present invention, the guidance of adaptive information according to a movement of the location may be possible as described above.

For example, in FIG. 7, if the location of a user terminal (for example, 21) does not correspond to the location information, that is, if the user terminal (for example, 21) is present outside the third disaster area 42, the user terminal (for example, 21) may not receive matching disaster notification information from the disaster notification server 100. However, since at least the location information has already been received, the user terminal (for example, 21) determines whether its own moving direction is directed toward the location information although the user terminal does not now correspond to the location information. Accordingly, there is an effect in that the guidance of corresponding adaptive information is possible (for example, the playback of warning content, such as that described above).

Meanwhile, in accordance with another embodiment of the present invention, although the user terminal (for example, 21) determines that specified matching location information included in a location information set corresponds to its own location, it may include the identification information of at least one piece of false location information in addition to the identification information of the matching location information in a content transmission request and sends the content transmission request to the disaster notification server 100.

Figure 8:
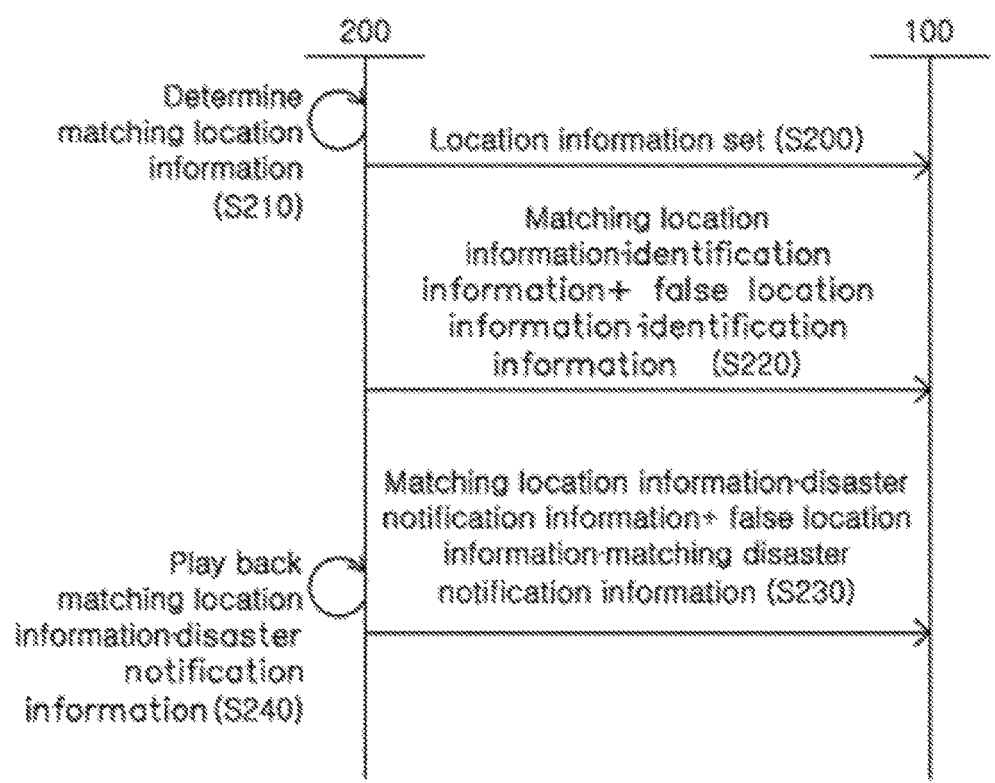
FIG. 8 is a diagram for illustrating a method for a disaster notification service using false location information in accordance with an embodiment of the present invention.

Such an example is shown in FIG. 8.

FIG. 8 is a diagram for illustrating a method for a disaster notification service using false location information in accordance with an embodiment of the present invention.

Referring to FIG. 8, the user terminal (for example, 21) may receive a location information set from the disaster notification server 100 (S200). Accordingly, the user terminal (for example, 21) may determine whether the location information set corresponds to its own location. That is, the user terminal (for example, 21) may determine matching location information (S210).

If, as a result of the determination, specific location information (for example, location information 1) may be determined to be matching location information. Accordingly, as described above, the user terminal (for example, 21) may include the identification information of the matching location information in a content transmission request and send the content transmission request. In some embodiments, however, the user terminal (for example, 21) may further include the identification information of at least one piece of false location information in the content transmission request and may send the content transmission request to the disaster notification server 100 (S220). If the identification information of the false location information is included in the content transmission request as described above, the disaster notification server 100 may send content, including disaster notification information corresponding to the identification information of the false location information in addition to matching disaster notification information corresponding to the identification information of the matching location information, to the user terminal (for example, 21) (S230). That is, the disaster notification server 100 is unable to be aware of what is location information corresponding to the actual location of the user terminal (for example, 21).

However, the user terminal (for example, 21) may play back the matching disaster notification information corresponding to the matching location information because it is aware of its own location, that is, the matching location information corresponding to its own location (S240). That is, the user terminal (for example, 21) may not play back the disaster notification information corresponding to the false location information.

Accordingly, the disaster notification server 100 provides disaster notification information to only a user related to a disaster location, but the disaster notification server 100 does not collect the location of a user terminal (for example, 21) and resultantly cannot specify a detailed location of the user terminal (for example, 21).

Meanwhile, an example of an application system for implementing a technological spirit, such as that described above, is shown in FIG. 5.

Figure 5:
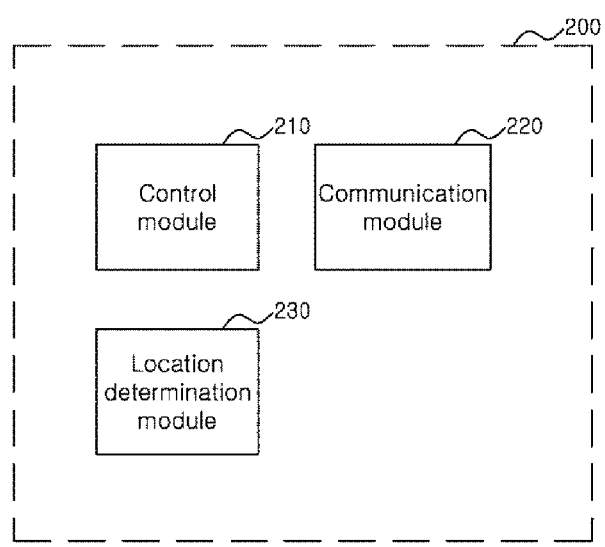
FIG. 5 is a diagram for illustrating a schematic configuration of an application system according to an embodiment of the present invention.

FIG. 5 is a diagram for illustrating a schematic configuration of the application system according to an embodiment of the present invention.

Referring to FIG. 5, an application for implementing the technological spirit of the present invention may be installed in each of the plurality of user terminals 20 to implement the application system 200 as described above.

The application system 200 may include a control module 210, a communication module 220, and a location determination module 230.

The control module 210 may control the functions and/or resources of other elements (for example, the communication module 220 and/or the location determination module 230 etc.) of the application system 200.

The communication module 220 may perform communication with the disaster notification server 100. Specifically, the communication module 220 may receive a location information set from the disaster notification server 100 and send a content transmission request, such as that described above, to the disaster notification server 100. Furthermore, the communication module 220 may receive content from the disaster notification server 100.

The location determination module 230 may determine the location of a user terminal (for example, 21) in which the application system 200 has been installed. The meaning that the location determination module 230 determines the location of a user terminal (for example, 21) may be defined as a meaning including a case where a location determined by an OS installed in the user terminal (for example, 21) or another different element is received by the location determination module 230.

The control module 210 may determine whether a location information set received through the communication module 220 corresponds to the location of a user terminal (for example, 21) determined by the location determination module 230. Furthermore, the control module 210 may determine the matching location information of location information included in the location information set.

Accordingly, the control module 210 may send a content transmission request, including the identification information of matching location information, to the disaster notification server 100 through the communication module 220, and may receive content, including matching disaster notification information corresponding to the matching location information, from the disaster notification server 100 as a response to the transmission of the content transmission request.

Furthermore, the matching location information may be location information that has been set in stages to include n disaster areas as described above. Furthermore, matching disaster notification information for each area corresponding to each disaster area may be included in the matching disaster notification information. Of course, although a plurality of disaster areas is included in the location information, only any one piece of matching disaster notification information may be included in the content.

Furthermore, as described above, if the location of a user terminal (for example, 21) corresponds to matching location information, the control module 210 receives the matching disaster notification information from the disaster notification server 100, but may play back corresponding matching disaster notification information only when it is included in a predetermined m disaster area (for example, a second disaster area).

Furthermore, the control module 210 may determine the moving direction of a user terminal (for example, 21) through the location determination module 230 and may play back warning content, such as that described above, in the user terminal if it determines that the determined moving direction moves from a current location to the direction of a lower disaster area.

Furthermore, as described above, although specific location information included in a location information set is determined to be matching location information, the control module 210 may send the content transmission request, further including the identification information of at least one piece of false location information in addition to the identification information of the matching location information, to the disaster notification server 100.

Accordingly, the content received through the communication module 220 may further include disaster notification information corresponding to the identification information of the false location information. However, the control module 210 may play back only the matching disaster notification information of the disaster notification information included in the received content.

Furthermore, in some implementation examples, the technological spirit in which the identification information of false location information is used and the technological spirit in which stepwise location information is used may be used together.

For example, the control module 210 may receive a location information set including pieces of location information implemented as stepwise location information and may determine matching location information based on the received information. Furthermore, even in this case, the control module 210 may include the identification information of the false location information in the content transmission request. Furthermore, even in this case, the control module 210 may perform the playback of the matching disaster notification information or the playback of the warning content as described with reference to FIGS. 6 and 7.

The method for a disaster notification service according to an embodiment of the present invention may be implemented in a computer-readable recording medium in the form of computer-readable code. The computer-readable recording medium includes all types of recording devices in which data readable by a computer system is stored. Examples of the computer-readable recording medium include ROM, RAM, CD-ROM, magnetic tapes, hard disks, floppy disks, and optical data storage. Furthermore, the computer-readable recording medium includes one implemented in the form of carrier waves (for example, transmission through the Internet). Furthermore, the computer-readable recording medium may be distributed to computer systems connected over a network, and the computer-readable code may be stored and executed in a distributed manner. Furthermore, a functional program, code and code segments for implementing the present invention may be easily inferred by programmers in the art to which the present invention pertains.

Although the present invention has been described in connection with one embodiment illustrated in the drawings, this is only illustrative. A person having ordinary skill in the art may understand that various modifications and other equivalent embodiments are possible. Accordingly, the true range of protection of the present invention should be determined by the technological spirit of the following claims.

The invention claimed is:

1. A method for a disaster notification service comprising steps of:
   receiving, by a disaster notification server, disaster information comprising a disaster location of a disaster and disaster notification information;
   specifying, by the disaster notification server, a location information set comprising location information corresponding to each disaster location of the at least one piece of disaster information;
   sending, by the disaster notification server, the specified location information set to a plurality of user terminals without regard to individual locations of the user terminals;
   receiving a content transmission request, comprising identification information of matching location information, from any one of the plurality of user terminals if the any one user terminal determines that a location of the user terminal is included in the matching location information included in the location information set; and
   sending, by the disaster notification server, content comprising matching disaster notification information corresponding to the matching location information to the user terminal in response to the reception of the content transmission request,
   wherein each of the user terminals determines whether or not its location corresponds to the disaster location.

2. The method of claim 1, further comprising a step of specifying, by the disaster notification server, a first disaster area comprising a disaster location corresponding to first disaster information when the first disaster information is registered,
   wherein the step of specifying the location information set comprises specifying information about the specified first disaster area as first location information corresponding to the first disaster information.

3. The method of claim 2, further comprising a step of further specifying (n−1) (n is a natural number of 2 or more) second to n-th disaster areas comprising the first disaster area and having a wider range than the first disaster area, wherein:
   the step of specifying the location information set comprises specifying information about the specified first disaster area and the further specified (n−1) disaster areas as the first location information corresponding to the first disaster information; and
   the k-th (k is a natural number of 2 or more to n or less) disaster area is an area which comprises a (k−1)-th disaster area and which is set to have a wider range than the (k−1)-th disaster area.

4. The method of claim 3, wherein if the user terminal determines the first location information to be the matching location information corresponding to the location of the user terminal, the user terminal plays back the matching disaster notification information only when the location of the user terminal is included in an m-th disaster area corresponding to predetermined m (m is a natural number of 1 or more to (n−1) or less) of n disaster areas included in the first location information.

5. The method of claim 3, wherein:
   if the user terminal determines the first location information to be the matching location information corresponding to the location of the user terminal, the matching disaster notification content is transmitted to the user terminal; and
   if the user terminal determines that the location of the user terminal changes to a direction of a (p−1)-th disaster area in a state in which the location corresponds to a p-th (p is a natural number of 1 or more to n or less) disaster area of n disaster areas included in the first location information, the user terminal plays back warning content.

6. The method of claim 1, wherein:
   the step of receiving the content transmission request comprising the identification information of the matching location information from the user terminal comprises receiving the content transmission request further comprising identification information of at least one piece of false location information;
   the step of sending, by the disaster notification server, the content comprising the matching disaster notification information corresponding to the matching location information to the user terminal in response to the reception of the content transmission request comprises sending the content, further comprising disaster notification information corresponding to the identification information of the false location information, to the user terminal; and
   only the matching disaster notification information is played back by the user terminal.

7. A method for a disaster notification service comprising steps of:
   when a disaster notification server sends a location information set comprising location information corresponding to each disaster location of at least one piece of disaster information to a plurality of user terminals without regard to individual locations of the user terminals, the at least one piece of disaster information comprising the disaster location and disaster notification information being registered with the disaster notification server;
   determining, by an application system installed in any one of the plurality of user terminals, whether a location of the user terminal is included in matching location information, which is any one piece of location information included in the location information set;
   sending, by the application system, a content transmission request comprising identification information of the matching location information to the disaster notification server if the application system determines that the location of the user terminal is included in the matching location information; and receiving, by the application system, content comprising matching disaster notification information corresponding to the matching location information from the disaster notification server as a response to the transmission of the content transmission request, wherein each of the user terminals determines whether or not its location corresponds to the disaster location.

8. The method of claim 7, wherein the matching location information is implemented as information comprising n (n is a natural number of 2 or more) first to n-th disaster areas, wherein a k-th (k is a natural number of 2 or more to n or less) disaster area is an area which comprises a (k−1)-th disaster area and which is set to have a wider range than the (k−1)-th disaster area.

9. The method of claim 8, further comprising a step of playing back, by the application system, the matching disaster notification information in the user terminal only when the location of the user terminal is included in an m-th disaster area corresponding to predetermined m (m is a natural number of 1 or more to (n−1) or less) of the n disaster areas included in the matching location information.

10. The method of claim 8, further comprising a step of playing back, by the user terminal, warning content when the application system determines that the location of the user terminal changes to a direction of a (p−1)-th disaster area in a state in which the location corresponds to a p-th (p is a natural number of 1 or more to n or less) disaster area of the n disaster areas included in the matching location information.

11. The method of claim 7, wherein:
the step of sending the content transmission request comprises sending, by the application system, the content transmission request further comprising identification information of at least one piece of false location information;
the step of receiving the content comprises receiving, by the application system, the content further comprising disaster notification information corresponding to the identification information of the false location information; and
the application system plays back only the matching disaster notification information.

12. A non-transitory computer readable medium having a computer program product installed in a data processing device and recorded to execute the method according to claim 1.

13. A disaster notification server, comprising:
a location information set specification unit configured to specify location information set comprising location information corresponding to a each disaster location of at least one piece of disaster information when disaster information comprising the disaster location and disaster notification information is received;
a communication unit which sends the specified location information set to a plurality of user terminals and receives a content transmission request comprising identification information of matching location information if any one of the plurality of user terminals determines that a location of the user terminal is included in the matching location information included in the location information set; and
a controller configured to send content comprising matching disaster notification information corresponding to the matching location information to the user terminal in response to the reception of the content transmission request, wherein:
the communication unit is configured to receive the content transmission request further comprising identification information of at least one piece of false location information;
the controller is configured to send the content further comprising disaster notification information corresponding to the identification information of the false location information to the user terminal; and
only matching disaster notification information is played back by the user terminal.

14. The disaster notification server of claim 13, wherein the location information set specification unit specifies a first disaster area comprising a disaster location corresponding to first disaster information when the first disaster information is registered and specifies information about the specified first disaster area as first location information corresponding to the first disaster information.

15. The disaster notification server of claim 14, wherein:
the location information set specification unit is further configured to specify (n−1) (n is a natural number of 2 or more) second to n-th disaster areas comprising the first disaster area and having a wider range than the first disaster area and specify information about the specified first disaster area and the further specified (n−1) disaster areas as the first location information corresponding to the first disaster information; and
the k-th (k is a natural number of 2 or more to n or less) disaster area is an area which comprises a (k−1)-th disaster area and which is set to have a wider range than the 1(k−1)-th disaster area.

16. An application system installed in a user terminal, comprising:
a communication module configured to receive location information set comprising location information corresponding to each disaster location of at least one piece of disaster information from a disaster notification server without regard to a location of the user terminal, the at least one piece of disaster information comprising the disaster location and disaster notification information being registered with the disaster notification server;
a location determination module configured to determine the location of the user terminal; and
a control module configured to determine whether the determined location of the user terminal is included in matching location information, which is any one of pieces of location information included in the location information set,
wherein the control module sends a content transmission request comprising identification information of the matching location information to the disaster notification server through the communication module if it is determined that the location of the user terminal is included in the matching location information and receives content comprising matching disaster notification information corresponding to the matching location information from the disaster notification server as a response to the transmission of the content transmission request.

17. The application system of claim 16, wherein:
the matching location information is implemented as information comprising n (n is a natural number of 2 or more) first to n-th disaster areas; and a k-th (k is a natural number of 2 or more to n or less) disaster area is an area which comprises a (k−1)-th disaster area and which is set to have a wider range than the (k−1)-th disaster area.

18. The application system of claim 17, wherein the control module determines whether the location of the user terminal is included in an m-th disaster area corresponding to predetermined m (m is a natural number of 1 or more to (n−1) or less) of the n disaster areas included in the matching location information and plays back the matching disaster notification information in the user terminal only when the location of the user terminal is included in the m-th disaster area.

19. The application system of claim 17, wherein the control module plays back the matching disaster notification information in the user terminal only when the location of the user terminal is included in an n-th disaster area corresponding to predetermined p (p is a natural number of 1 or more to (p−1) or less) of the n disaster areas included in the matching location information.

20. The application system of claim 16, wherein:
the control module is configured to send the content transmission request further comprising identification information of at least one piece of false location information and receive the content further comprising disaster notification information corresponding to the identification information of the false location information; and
the control module is configured to play back only the matching disaster notification information of disaster notification information included in the received content.

* * * * *